(12) United States Patent
Fernando

(10) Patent No.: US 9,789,635 B2
(45) Date of Patent: Oct. 17, 2017

(54) INLET PIPE AND MOLDING METHOD OF INLET PIPE

(71) Applicant: TOYOTA JIDOSHA KABUSHIKI KAISHA, Toyota-shi, Aichi-ken (JP)

(72) Inventor: Dilshan Fernando, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 14/626,196

(22) Filed: Feb. 19, 2015

(65) Prior Publication Data

US 2015/0246467 A1    Sep. 3, 2015

(30) Foreign Application Priority Data

Feb. 28, 2014 (JP) .................... 2014-039724

(51) Int. Cl.

| | |
|---|---|
| *F15D 1/04* | (2006.01) |
| *B29C 45/00* | (2006.01) |
| *B29C 49/04* | (2006.01) |
| *B29C 49/20* | (2006.01) |
| *B29C 49/00* | (2006.01) |
| *F16L 9/127* | (2006.01) |
| *B29L 31/00* | (2006.01) |
| *B29L 23/00* | (2006.01) |
| *B29L 31/30* | (2006.01) |

(52) U.S. Cl.
CPC .............. *B29C 45/00* (2013.01); *B29C 49/00* (2013.01); *B29C 49/04* (2013.01); *B29C 49/20* (2013.01); *F16L 9/127* (2013.01); *B29C 2049/2047* (2013.01); *B29C 2791/001* (2013.01); *B29L 2023/004* (2013.01); *B29L 2031/3055* (2013.01); *B29L 2031/7492* (2013.01)

(58) Field of Classification Search
CPC ........ F16L 15/02; F16L 9/127; F16L 27/0808
USPC .................................. 138/109, 177; 285/179
See application file for complete search history.

(56) References Cited

U.S. PATENT DOCUMENTS

| | | | | |
|---|---|---|---|---|
| 3,262,719 A | * | 7/1966 | Gemma ................ | F16L 13/007 285/181 |
| 3,977,730 A | * | 8/1976 | Seick .................... | F16L 43/001 138/92 |
| 4,410,281 A | * | 10/1983 | Crookes ............... | B01F 5/0646 138/178 |
| 4,822,080 A | * | 4/1989 | Darish ................... | F16L 47/04 285/179 |
| 5,409,066 A | * | 4/1995 | McHugh ............... | A62C 35/68 169/16 |
| 5,529,084 A | * | 6/1996 | Mutsakis ................ | F15D 1/04 137/13 |

(Continued)

FOREIGN PATENT DOCUMENTS

| | | |
|---|---|---|
| CN | 203214202 U | 9/2013 |
| JP | S60-95178 A | 5/1985 |

(Continued)

*Primary Examiner* — Patrick F Brinson
(74) *Attorney, Agent, or Firm* — Oliff PLC

(57) ABSTRACT

Provided are an inlet pipe including a curved portion having a curved shape, and a molding method thereof. In the molding method of the inlet pipe, that one part of the inlet pipe which includes a curved portion having a large curvature is molded by injection molding, and the other part of the inlet pipe except the one part molded by the injection molding is molded by blow molding.

6 Claims, 4 Drawing Sheets

(56) References Cited

U.S. PATENT DOCUMENTS

| | | | |
|---|---|---|---|
| 5,609,212 A * | 3/1997 | McHugh | A62C 35/68 169/16 |
| 6,176,213 B1 | 1/2001 | Arnegger | |
| 2013/0146170 A1 | 6/2013 | Jang et al. | |

FOREIGN PATENT DOCUMENTS

| JP | S60-183265 U | 12/1985 |
|---|---|---|
| JP | H05-31761 A | 2/1993 |
| JP | 2000-508397 A | 7/2000 |

* cited by examiner

INLET PIPE AND MOLDING METHOD OF INLET PIPE

INCORPORATION BY REFERENCE

The disclosure of Japanese Patent Application No. 2014-039724 filed on Feb. 28, 2014 including the specification, drawings and abstract is incorporated herein by reference in its entirety.

BACKGROUND OF THE INVENTION

1. Field of the Invention

The present invention relates to an inlet pipe provided in an internal combustion engine, and a molding method of the inlet pipe.

2. Description of Related Art

An internal combustion engine includes an inlet pipe configured to introduce intake air into a combustion chamber. The inlet pipe is often molded into a curved shape in accordance with a mounting space of the internal combustion engine, and positions of other components attached to the internal combustion engine.

Published Japanese Translation of PCT Application No. 2000-508397 (JP-A-2000-508397) describes that an inlet pipe is molded by blow molding. In the blow molding, a component is generally molded in the following manner. That is, resin or the like is melted and extruded from an extruder into a tubular shape, and the resin thus extruded is sandwiched by a die. In this state, the resin is in a shape just extruded from the extruder, but air is blown inside the resin having a tubular shape so that molten resin is pushed against an inner surface of the die. The resin is then cooled down to be hardened. Thus, a tubular component having an outer shape along an inner surface shape of the die is completed. By employing such blow molding, a tubular component having a curved complicated outer shape like an inlet pipe can be molded easily.

In the meantime, in the blow molding, it is possible to accurately mold the tubular component so that its outer shape fits an inner surface of the die. However, the molding is performed by blowing the air to push the resin against the die from its inside, so it is difficult to control its wall thickness. For example, in a course of pressing the resin against the die by the air thus blown, the part of the tubular component which is stretched to a large extent has a thin wall thickness, while that part of the tubular component which is stretched to a small extent has a thick wall thickness.

Accordingly, as described in JP-A-2000-508397, in a case where an inlet pipe is manufactured by the blow molding, particularly a curved portion of the inlet pipe is configured such that: resin of that outer part of the curved portion which has a small curvature is stretched, while resin of that inner part of the curved portion which has a large curvature is stretched to a small extent. Because of this, a wall thickness of the inner part having a large curvature might be thick. Note that, as the curvature of the curved portion is larger, such an increase in the wall thickness of the inner part is shown more markedly. When the wall thickness becomes thick as such, a passage sectional area in the curved portion is decreased, so that a pressure loss might be increased. Further, when the passage sectional area is decreased, a flow speed of air flowing inside the inlet pipe is increased. As a result, the air flowing inside the inlet pipe may be separated from an inner wall surface of the curved portion, which may easily cause disturbance in its airflow. Accordingly, in a case where an inlet pipe having a curved portion is manufactured by the blow molding, a pressure loss of the inlet pipe might be increased.

SUMMARY OF THE INVENTION
(US,EP,CN,BR,IN)

The present invention is accomplished in view of the above problem, and provides an inlet pipe that is able to restrain a pressure loss, and a molding method of such an inlet pipe.

In view of this, one aspect of the present invention provides a molding method of an inlet pipe including a curved portion having a curved shape. The molding method of the inlet pipe includes a step of molding by injection molding, and a step of molding by blow molding. In the step of molding by the injection molding, that one part of the inlet pipe which includes a curved portion having a largest curvature is molded by the injection molding. In the step of molding by the blow molding, the other part of the inlet pipe except the one part molded by the injection molding is molded by the blow molding.

In the injection molding, the inlet pipe is molded by use of an inner die and an outer die. For example, the inlet pipe is molded by use of an outer die and a core. On that account, by adjusting a magnitude of a gap between the die and the core, it is possible to adjust a wall thickness of the inlet pipe to a desired thickness with accuracy.

In the above molding method, that one part of the inlet pipe which includes a part having a largest curvature is molded by the injection molding. Accordingly, a wall thickness of the part having a largest curvature can be adjusted to a desired thickness with accuracy. Hereby, in comparison with a case where the whole inlet pipe is molded by the blow molding, it is possible to restrain an increase in a wall thickness of the inlet pipe, and to restrain a decrease in a passage sectional area of the inlet pipe. Accordingly, it is possible to restrain an increase in a pressure loss caused due to the decrease in the passage sectional area, and to restrain an airflow from being separated from an inner wall of the inlet pipe due to an increase in a flow speed of the air.

Further, when the flow speed of the air flowing inside the inlet pipe is large, the airflow is easy to be disturbed due to roughness of an inner surface of the inlet pipe, so that the pressure loss is easy to increase. In this regard, the injection molding can control the roughness of the inner surface of the inlet pipe by the inner die. Accordingly, in the above molding method, even if the flow speed of the air is large, it is possible to restrain disturbance of the airflow in the inlet pipe and to restrain the increase in the pressure loss. Consequently, according to the above molding method, it is possible to manufacture an inlet pipe that is able to restrain the pressure loss.

Further, in the molding method of the inlet pipe, that one part of the inlet pipe in which the curved portion has a curvature of a predetermined value or more may be molded by the injection molding. That other part of the inlet pipe which has a curvature of less than the predetermined value may be molded by the blow molding.

Like the above molding method, if that part of the inlet pipe in which the curved portion has a curvature of the predetermined value or more and a pressure loss might be caused is molded by the injection molding, it is possible to restrain the pressure loss of the inlet pipe more.

Further, in the molding method of the inlet pipe, the curved portion having the largest curvature may be a curved portion configured to connect, at an acute angle, a pipe connected to an upstream side and a pipe connected to a downstream side, and that one part of the inlet pipe which includes the curved portion may be molded by the injection molding. The other part except the part molded by the injection molding may be molded by the blow molding.

Further, in a case where the pipes are connected at an acute angle in the inlet pipe, that is, in a case where the inlet pipe is curved so that an angle formed by a drawing direction of the pipe connected to the upstream side and a drawing direction of the pipe connected to the downstream side is less than 90°, a direction of the airflow flowing inside the inlet pipe is largely changed. Because of this, the airflow is easy to be separated from the inner wall of the inlet pipe at the part thus curved.

However, in the above molding method, the curved portion having a large curvature is a curved portion configured to connect, at an acute angle, the pipe connected to the upstream side and the pipe connected to the downstream side, and that one part of the inlet pipe which includes the curved portion is molded by the injection molding. Accordingly, even if the flow speed of the air is large, it is possible to restrain the disturbance of the airflow in the inlet pipe. This makes it possible to restrain the airflow from being separated, thereby restraining the increase in the pressure loss.

Further, in the molding method of the inlet pipe; the injection molding may be performed by use of resin having elasticity. The blow molding may be performed by use of resin harder than the resin having elasticity.

In the above molding method, that part of the inlet pipe which includes the curved portion having a largest curvature is molded by use of the resin having elasticity. Accordingly, in a case where a largest curvature part of the inlet pipe manufactured by this molding method is connected to other components, its assembly is easily performed. Further, vibration is absorbed in the part made of the resin having elasticity, so that transmission of the vibration between the inlet pipe and the other components can be restrained.

In such a molding method as described above, the other part of the inlet pipe except the one part molded by the injection molding is molded by use of the resin harder than the resin forming the part having a largest curvature. Accordingly, durability of the inlet pipe manufactured by this molding method can be secured.

Hereby, according to the above molding method, it is possible to manufacture the inlet pipe which secures the durability, which can be easily assembled to other components, and which has a function to restrain the transmission of the vibration.

Another aspect of the present invention provides an inlet pipe including a curved portion having a curved shape. The inlet pipe includes one part of the inlet pipe and the other part of the inlet pipe. The one part of the inlet pipe includes a curved portion having a largest curvature. The one part of the inlet pipe is molded by injection molding. The other part of the inlet pipe is a part except the one part molded by the injection molding. The other part of the inlet pipe is molded by blow molding.

In the injection molding, the inlet pipe is molded by use of an inner die and an outer die. For example, the inlet pipe is molded by use of an outer die and a core. On that account, by adjusting a magnitude of a gap between the die and the core, it is possible to adjust a wall thickness of the inlet pipe to a desired thickness with accuracy.

In the configuration of the inlet pipe, that one part of the inlet pipe which includes the curved portion having a largest curvature is molded by the injection molding. Hereby, a wall thickness of the one part including the curved portion having a largest curvature can be adjusted to a desired thickness with accuracy. As a result, in comparison with a case where the whole inlet pipe is molded by the blow molding, it is possible to restrain an increase in a wall thickness of the inlet pipe. Accordingly, it is possible to restrain an increase in a pressure loss due to a decrease in a passage sectional area. Consequently, it is possible to restrain an airflow from being separated from an inner wall of the inlet pipe due to an increase in a flow speed of the air.

Further, when the flow speed of the air flowing inside the inlet pipe is large, the airflow is easy to be disturbed due to roughness of an inner surface of the inlet pipe, so that the pressure loss is easy to increase. In this regard, the injection molding can control the roughness of the inner surface of the inlet pipe by the inner die. Hereby, in the above configuration, even if the flow speed of the air is large, it is possible to restrain disturbance of the airflow at the part having the largest curvature and to restrain the increase in the pressure loss. Thus, according to the configuration of the inlet pipe, the pressure loss can be restrained.

Further, in the inlet pipe the one part of the inlet pipe in which the curved portion has a curvature of greater than a predetermined value may be molded by the injection molding. The other part of the inlet pipe may be molded by the blow molding.

Further, in the inlet pipe, that one part of the inlet pipe which is molded by the injection molding may be made of resin having elasticity. The other part of the inlet pipe which is molded by the blow molding may be made of resin harder than the resin having elasticity.

In the configuration of the inlet pipe, that one part of the inlet pipe which is molded by the injection molding has elasticity. Accordingly, in a case where the one part molded by the injection molding is connected to the other part of the inlet pipe, its assembly is easily performed. Further, since the one part molded by the injection molding has elasticity, vibration in the one part is absorbed, so that transmission of the vibration between the inlet pipe and other components can be restrained.

In the meantime, that other part of the inlet pipe which is molded by the blow molding is harder than that one part of the inlet pipe which is molded by the injection molding. Accordingly, it is possible to secure durability in that other part of the inlet pipe which is molded by the blow molding. Hereby, according to the above configuration, the assembly of the inlet pipe to other components can be performed easily while the durability is secured. Further, the transmission of the vibration can be also restrained.

Further, in the inlet pipe, that one part of the inlet pipe which is molded by the injection molding may include the curved portion curved so as to connect, at an acute angle, a pipe connected to an upstream side and a pipe connected to a downstream side.

Further, in a case where the pipes are connected at an acute angle in the inlet pipe, that is, in a case where the inlet pipe is curved so that an angle formed by a drawing direction of the pipe connected to the upstream side and a drawing direction of the pipe connected to the downstream side is less than 90°, a direction of the airflow flowing inside the inlet pipe is largely changed. Because of this, the airflow is easy to be separated from the inner wall of the inlet pipe at the part thus curved. However, in the inlet pipe configured as described above, that one part of the inlet pipe which includes the curved portion curved so as to connect, at an acute angle, the pipe connected to the upstream side and the pipe connected to the downstream side is molded by the injection molding. Hereby, even if the flow speed of the air is large, it is possible to restrain disturbance of the airflow and to restrain the increase in the pressure loss.

In the inlet pipe and the molding method of the inlet pipe according to the present invention, the part having a large curvature, configured as described above, is molded by the injection molding. This makes it possible to restrain the airflow flowing inside the inlet pipe from being separated from the inlet pipe, thereby restraining the increase in the pressure loss.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
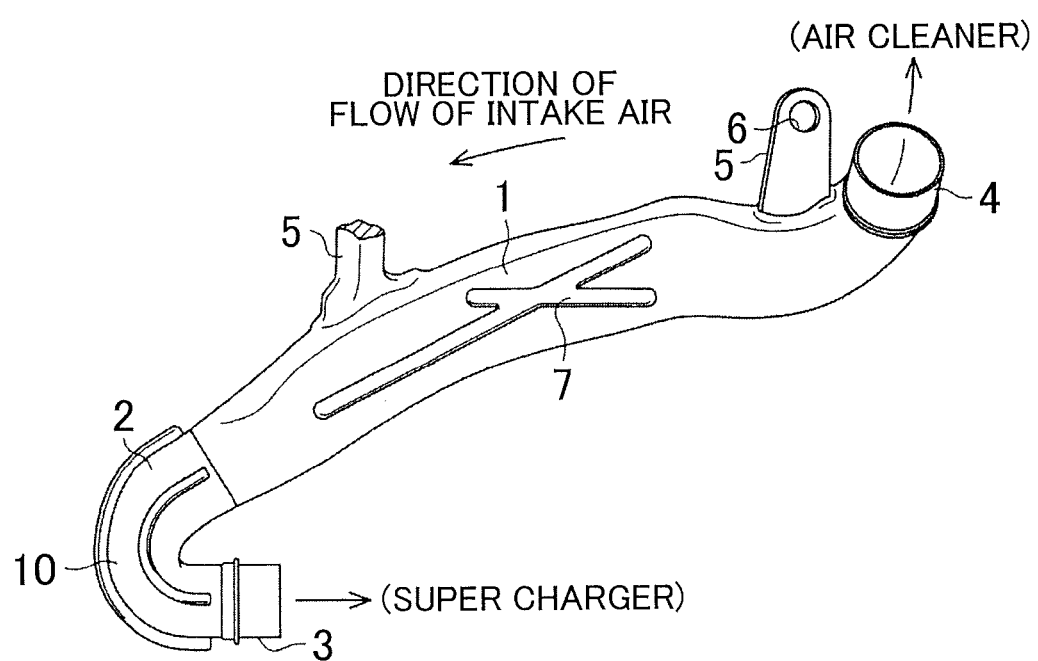
FIG. 1 is a perspective view of an inlet pipe of one embodiment of the present invention.

One embodiment of an inlet pipe and a molding method of the inlet pipe is described below with reference to FIGS. 1 to 4. As illustrated in FIG. 1, the inlet pipe is a generally cylindrical pipe in which both ends are opened. The inlet pipe is constituted by: an upstream pipe portion 1 placed on an upstream side (on the right side in FIG. 1) in a flow direction of intake air; and a downstream pipe portion 2 placed on a downstream side (on the left side in FIG. 1) in the flow direction of the intake air.

The downstream pipe portion 2 is made of flexible resin having elasticity. The downstream pipe portion 2 includes an opening 3 in its end on an intake-air downstream side. The opening 3 is connected, for example, to a super charger.

Meanwhile, the upstream pipe portion 1 is made of rigid resin that is harder than the resin forming the downstream pipe portion 2. The upstream pipe portion 1 includes an opening 4 that is opened on the upstream side in the flow direction of the intake air. The opening 4 is connected, for example, to an air cleaner. Further, the upstream pipe portion 1 is provided with two flanges 5 projecting from the upstream pipe portion 1. Each of the flanges 5 is provided with an attachment hole 6, so that the inlet pipe is fastened to the internal combustion engine with a bolt passing through the attachment hole 6. Note that the upstream pipe portion 1 is provided with two ribs 7 that cross each other and are provided on an outer peripheral surface of the upstream pipe portion 1. The upstream pipe portion 1 has a curved shape in accordance with positions and the like of other components attached to the internal combustion engine.

Figure 2:
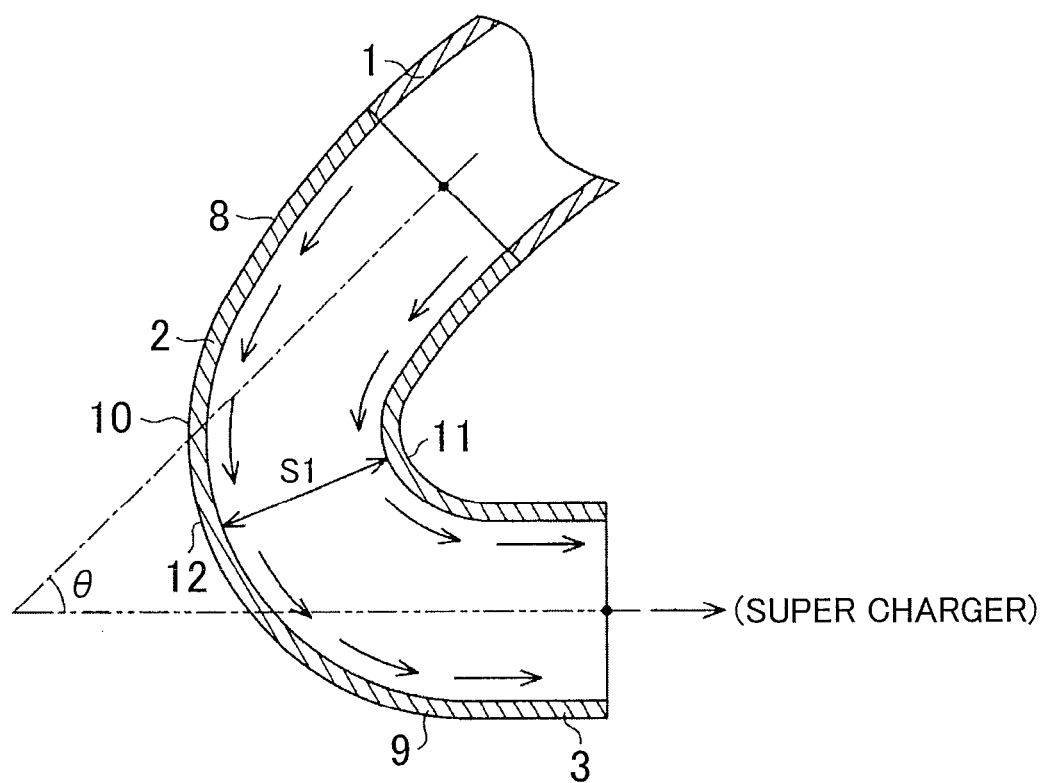
FIG. 2 is a sectional view illustrating a curved portion of the inlet pipe of the embodiment in a magnified manner.

Next will be described the downstream pipe portion 2 with reference to FIG. 2. As illustrated in FIG. 2, the downstream pipe portion 2 includes: an upstream pipe 8 connected to the upstream pipe portion 1; and a downstream pipe 9 connected to the super charger on the intake-air downstream side. The upstream pipe 8 and the downstream pipe 9 are connected to each other so that they form an acute angle. That is, the downstream pipe portion 2 includes a curved portion 10 that is curved so that an angle θ is 90° or less where the angle θ is formed by that drawing direction of the upstream pipe 8 which is indicated by an alternate long and short dash line in FIG. 2 and that drawing direction of the downstream pipe 9 which is indicated by an alternate long and two short dashes line in FIG. 2.

In the meantime, although the upstream pipe portion 1 is provided with a curved portion having a small curvature, the upstream pipe portion 1 is not provided with a curved portion like the curved portion 10 provided in the downstream pipe portion 2. The upstream pipe portion 1 illustrated in FIG. 2 in the present embodiment is not provided with such a portion in which an angle θ formed by an upstream pipe and a downstream pipe in the inlet pipe becomes an acute angle. Because of this, in the inlet pipe of the present embodiment illustrated in FIG. 1, that curved portion 10 of the downstream pipe portion 2 in which the angle θ formed by the upstream pipe 8 and the downstream pipe 9 in the inlet pipe is an acute angle corresponds to that part of the inlet pipe which has a large curvature, and also corresponds to that part of the inlet pipe which has a largest curvature shown in FIG. 2.

Figure 3A:
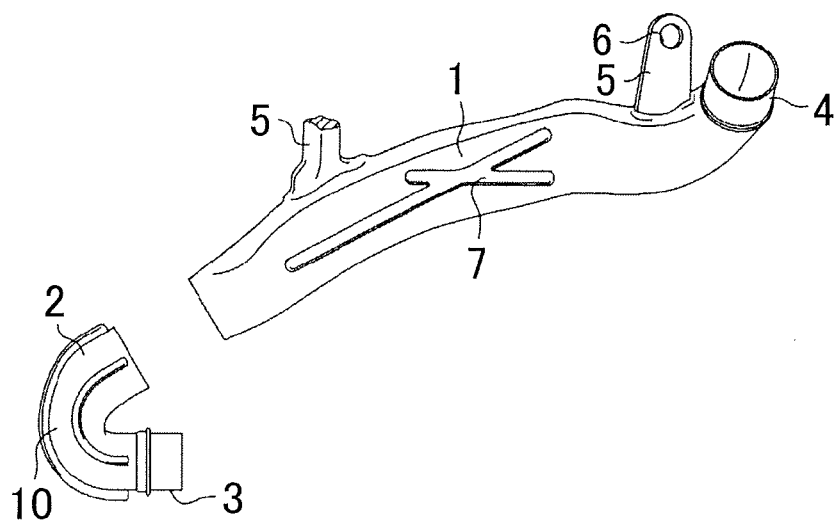
FIGS. 3A and 3B are perspective views each schematically illustrating a molding method of the inlet pipe of the embodiment.
Figure 3B:
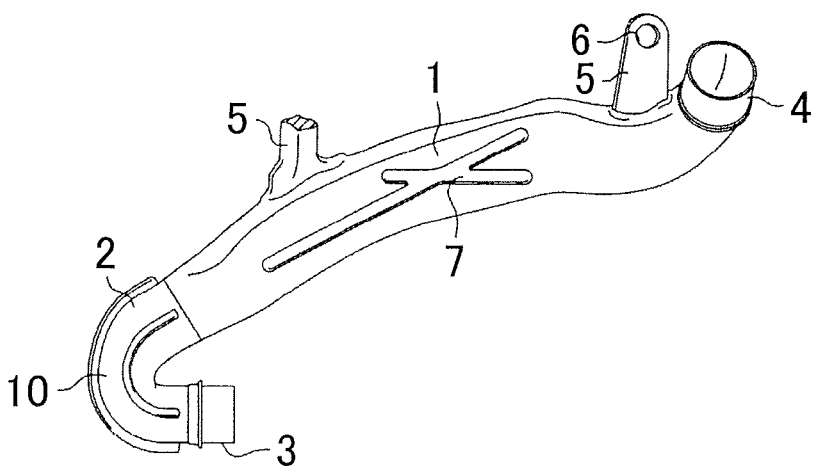

With reference to FIGS. 3A, 3B, the following describes a molding method of the inlet pipe. As illustrated in FIG. 3A, at the time when the inlet pipe is molded, the upstream pipe portion 1 and the downstream pipe portion 2 are first molded separately. The downstream pipe portion 2 is molded by use of an outer die and a core by injection molding using flexible resin having elasticity so that a wall thickness of the downstream pipe portion 2 has a desired thickness. Further, the upstream pipe portion 1 is molded integrally with the flanges 5 and the ribs 7 by blow molding using rigid resin harder than the flexible resin.

After that, as illustrated in FIG. 3B, the upstream pipe portion 1 and the downstream pipe portion 2 are welded in a state where the upstream pipe portion 1 and the downstream pipe portion 2 are positioned at predetermined relative positions, so that the upstream pipe portion 1 is connected to the downstream pipe portion 2.

Figure 4:
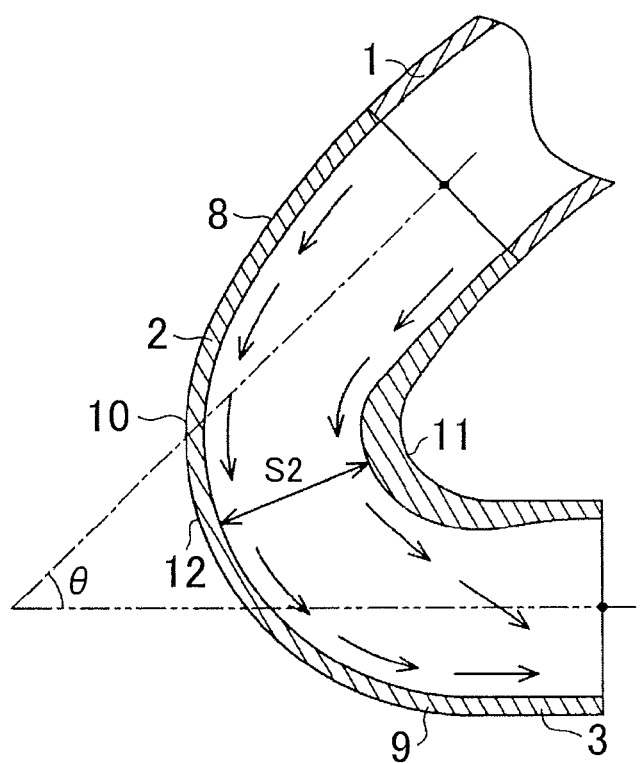
FIG. 4 is a sectional view schematically illustrating an airflow flowing inside a curved portion molded by blow molding as a related art.

Next will be described operations of the inlet pipe according to the present embodiment and the molding method of the inlet pipe, with reference to FIGS. 2 and 4. As illustrated in FIG. 4, in a case where a whole inlet pipe is manufactured by blow molding such that the whole inlet pipe is molded only by an outer die, a curved portion 10 of a downstream pipe portion 2 may have a thick wall thickness in an inner part 11 having a large curvature. When the wall thickness of the inner part 11 of the curved portion 10 is thick as such, a passage sectional area S2 at the curved portion 10 becomes smaller than passage sectional areas of the other parts of the curved portion 10, which makes it hard for the air to flow inside the curved portion 10. Further, as illustrated by arrows in FIG. 4, when the air passes through the part having a small passage sectional area, a flow speed of the air is increased. Accordingly, the air flowing inside the inlet pipe is separated from a wall surface of the inner part 11 of the curved portion 10, so that its airflow is easy to be disturbed. Particularly, in a case where an angle θ formed by a drawing direction (an alternate long and short dash line in FIG. 4) of an upstream pipe 8 of the curved portion 10 of the inlet pipe and a drawing direction (an alternate long and two short dashes line in FIG. 4) of a downstream pipe 9 thereof is an acute angle of 90° or less, a direction of the airflow flowing inside the inlet pipe is largely changed at the curved portion 10. This further easily causes the airflow to be separated.

Further, in the blow molding, the molding is performed only by the outer die, so it is difficult to control roughness of an inner surface of the inlet pipe. Because of this, when the flow speed of the air flowing inside the inlet pipe is large, the airflow is disturbed due to the roughness of the inner surface of the inlet pipe, and a pressure loss of the inlet pipe might be further increased.

Accordingly, in a case where the whole inlet pipe is manufactured by the blow molding, the pressure loss might be increased. In the meantime, as illustrated in FIG. 2, in the present embodiment, the downstream pipe portion 2 including the curved portion 10 having a largest curvature in the inlet pipe is molded by the injection molding. In the injection molding, the wall thickness can be adjusted with accuracy by adjusting a magnitude of a gap between the outer die and the core. Accordingly, the curved portion 10 in the downstream pipe portion 2 is molded so that its wall thickness is generally uniform at a desired thickness. Accordingly, as illustrated in FIG. 2, the curved portion 10 is configured such that an inner part 11 having a large curvature and an outer part 12 having a small curvature have generally the same wall thickness, so that a passage sectional area S1 of the curved portion 10 is generally uniform. That is, an increase in the wall thickness of the curved portion 10 is restrained in comparison with a case where the whole inlet pipe is molded by the blow molding as illustrated in FIG. 4.

Further, as illustrated in FIG. 2, since the angle θ formed by the drawing direction (the alternate long and short dash line in FIG. 2) of the upstream pipe 8 of the curved portion 10 and the drawing direction (the alternate long and two short dashes line in FIG. 2) of the downstream pipe 9 thereof is an acute angle of 90° or less, a direction of the airflow flowing inside the inlet pipe is largely changed at the curved portion 10. Because of this, if the flow speed of the air is large, the airflow might be separated from the wall surface of the inner part 11 of the curved portion 10. However, in a case where the inlet pipe is manufactured by the injection molding like the present embodiment, an increase in the wall thickness of the curved portion 10 is restrained in comparison with a case where the whole inlet pipe is manufactured by the blow molding. Accordingly, an increase in the flow speed of the air along with a decrease in the passage sectional area is also restrained. This consequently makes it possible to restrain the airflow from being separated from the wall surface of the inner part 11 of the curved portion 10.

Further, since the curved portion 10 is molded by use of the core, roughness of the inner surface of the curved portion 10 can be controlled by adjusting surface roughness of the core. Accordingly, even if the flow speed of the air passing through the curved portion 10 is large, the disturbance of the airflow is restrained.

Further, the downstream pipe portion 2 provided in the end of the inlet pipe is molded by use of flexible resin having elasticity. Accordingly, in a case where the inlet pipe manufactured by this molding method is connected to a super charger, it is possible to assemble the inlet pipe by elastically deforming the opening 3 of the downstream pipe portion 2, and thus, its assembly is easily performed. Further, vibration is absorbed in the downstream pipe portion 2 having such elasticity, so that transmission of the vibration between the downstream pipe portion 2 and the super charger is restrained.

Meanwhile, the upstream pipe portion 1 is molded by use of rigid resin that is harder than the resin forming the downstream pipe portion 2. Accordingly, the upstream pipe portion 1 of the inlet pipe manufactured by this molding method is harder than the downstream pipe portion 2, so that its durability is improved.

Further, since the upstream pipe portion 1 includes the ribs 7, its rigidity is improved. Consequently, the durability is increased still more. Note that, in a case where the whole inlet pipe having a complicated shape including the flanges 5 and the ribs 7 is manufactured by the injection molding, the number of dies is increased in comparison with the blow molding, which may increase manufacturing cost and the number of manufacturing processes. In this regard, in the present embodiment, the upstream pipe portion 1 is manufactured by the blow molding, so that it is possible to achieve a reduction in the manufacturing cost and a decrease in the number of the manufacturing processes.

According to the above embodiment described above, it is possible to obtain the following effects.

(1) The downstream pipe portion 2 including the curved portion 10 having a largest curvature in the inlet pipe is molded by the injection molding. This makes it possible to restrain a decrease in the passage sectional area due to an increase in the wall thickness of the curved portion 10. Further, it is possible to restrain the airflow from being separated from the wall surface of the inner part 11 of the curved portion 10. Moreover, it is possible to restrain an increase in the pressure loss caused due to the roughness of the inner surface. Accordingly, the pressure loss of the inlet pipe can be restrained.

(2) The downstream pipe portion 2 is molded by use of flexible resin having elasticity, and the upstream pipe portion 1 is molded by use of rigid resin harder than the downstream pipe portion 2. Accordingly, the assembly to other components can be performed easily while the durability of the inlet pipe is secured. Further, the transmission of vibration can be also restrained.

Note that the above embodiment can be modified as follows.

The above embodiment shows an example in which the downstream pipe portion 2 includes one curved portion 10 having a largest curvature. However, as Modification 1 of the present embodiment, the downstream pipe portion 2 may include a plurality of curved portions having a large curvature. Even with such a configuration, it is possible to yield the same effects as the effects (1) and (2).

Further, in such a configuration, among the curved portions in the inlet pipe, not only the curved portion having the largest curvature, but also a curved portion having a curvature of greater than a predetermined value may be molded by the injection molding, as Modification 2 of the present embodiment. Note that it is desirable that the predetermined value be a smallest value among curvatures of curved portions that might cause an increase in a pressure loss, when the curved portions are molded by the blow molding. According to this configuration, the pressure loss of the inlet pipe can be further restrained.

In the above embodiment, the upstream pipe portion 1 is connected to the downstream pipe portion 2 by welding. However, as Modification 3 of the present embodiment, a connection method of them may be other methods including a method to adhere them by use of an adhesive.

In addition to Modifications 1 to 3, the following modifications may be employed. That is, the flanges 5 and the ribs 7 may not be molded with the upstream pipe portion 1 by the blow molding. For example, after the upstream pipe portion 1 is molded by the blow molding, the flanges 5 and the ribs 7 may be adhered to the upstream pipe portion 1. Alternatively, the flanges 5 and the ribs 7 may not be provided in the upstream pipe portion 1.

The above embodiment deals with an example in which the downstream pipe portion 2 is provided with the curved portion 10 having a largest curvature. However, the curved portion 10 may be provided in the upstream pipe portion 1. In this case, that part of the upstream pipe portion 1 which is provided with the curved portion may be molded by the injection molding, and the other part except the part molded by the injection molding may be molded by the blow molding. Even with such a configuration, it is possible to yield the same effect as the effect (1).

The opening 4 of the upstream pipe portion 1 may be molded by use of resin having elasticity, and the other part of the upstream pipe portion 1 except the opening 4 may be molded by use of resin harder than the opening 4. According to such a configuration, it is possible to further easily assemble the inlet pipe to the air cleaner. That is, if the openings provided at both ends of the inlet pipe are molded by use of resin having elasticity, it is possible to easily assemble the inlet pipe.

In the above embodiment, the downstream pipe portion 2 is molded by use of flexible resin having elasticity, and the upstream pipe portion 1 is molded by use of rigid resin harder than the flexible resin forming the downstream pipe portion 2. However, the upstream pipe portion 1 may be molded by use of resin having hardness equivalent to the flexible resin forming the downstream pipe portion 2, or by use of resin softer than the resin forming the downstream pipe portion 2. Even with such a configuration, it is still possible to yield the same effect as the effect (1).

In the above embodiment, the downstream pipe portion 2 is molded by use of flexible resin having elasticity, but such a configuration may be omitted. For example, the whole inlet pipe may be molded by use of rigid resin.

The above embodiment deals with, as an example, such a configuration that, in the curved portion 10 of the downstream pipe portion 2, the angle θ formed by the upstream pipe 8 and the downstream pipe 9 is an acute angle. However, the same configuration as above may be applied to a case where the angle θ formed by the upstream pipe 8 and the downstream pipe 9 is an obtuse angle. That is, even in a case where the angle θ of the curved portion 10 is an obtuse angle, if the curvature of the curved portion 10 is largest and a pressure loss might be increased on the occasion of molding the curved portion 10 by the blow molding, the curved portion may be molded by the injection molding.

What is claimed is:

1. A molding method of an inlet pipe comprising:
   molding one part of the inlet pipe by injection molding, the one part including at least one curved portion, the at least one curved portion having a largest curvature among a plurality of portions of the inlet pipe; and
   molding, by blow molding, the other part of the inlet pipe except the one part molded by the injection molding, wherein
   the one part of the inlet pipe molded by the injection molding is made of resin having elasticity, and
   the other part of the inlet pipe molded by the blow molding is made of resin harder than the resin having elasticity.

2. The molding method of the inlet pipe, according to claim 1, wherein
   the one part of the inlet pipe molded by the injection molding further includes all portions of the inlet pipe having a curvature that is greater than a predetermined curvature value, and
   the other part of the inlet pipe molded by the blow molding includes all portions of the inlet pipe having a curvature of the predetermined curvature value or less.

3. The molding method of the inlet pipe, according to claim 1, wherein
   the curved portion having the largest curvature is a curved portion configured to connect, at an acute angle, a pipe connected to an upstream side and a pipe connected to a downstream side.

4. An inlet pipe comprising
   one part of the inlet pipe that includes at least one curved portion, the at least one curved portion having a largest curvature among a plurality of portions of the inlet pipe, wherein the one part of the inlet pipe is molded by injection molding, and
   an other part of the inlet pipe that is a part except the one part molded by the injection molding, wherein the other part of the inlet pipe is molded by blow molding,
   wherein the one part of the inlet pipe molded by the injection molding is made of resin having elasticity, and
   where the other part of the inlet pipes molded by the blow molding is made of resin harder than the resin having elasticity.

5. The inlet pipe according to claim 4, wherein
   the one part of the inlet pipe molded by the injection molding further includes all portions of the inlet pipe having a curvature that is greater than a predetermined curvature value, and
   the other part of the inlet pipe molded by the blow molding includes all portions of the inlet pipe having a curvature of the predetermined curvature value or less.

6. The inlet pipe according to claim 4, wherein
   the one part of the inlet pipe molded by the injection molding includes the curved portion having the largest curvature so as to connect, at an acute angle, a pipe connected to an upstream side and a pipe connected to a downstream side.

\* \* \* \* \*